US009862822B2

(12) United States Patent
Kwon et al.

(10) Patent No.: US 9,862,822 B2
(45) Date of Patent: Jan. 9, 2018

(54) THERMOPLASTIC RESIN COMPOSITION AND MOLDED ARTICLE MADE USING THE SAME

(71) Applicant: Samsung SDI Co., Ltd., Yongin-si (KR)

(72) Inventors: Keehae Kwon, Yongin-si (KR); Won Ko, Yongin-si (KR); Wonseon Lee, Yongin-si (KR); Chang Min Hong, Yongin-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 0 days.

(21) Appl. No.: 14/930,954

(22) Filed: Nov. 3, 2015

(65) Prior Publication Data
US 2016/0137837 A1    May 19, 2016

(30) Foreign Application Priority Data

Nov. 18, 2014    (KR) .................. 10-2014-0160794

(51) Int. Cl.
C08K 3/08       (2006.01)
C08L 69/00      (2006.01)
C08J 5/00       (2006.01)

(52) U.S. Cl.
CPC .............. C08L 69/00 (2013.01); C08J 5/00 (2013.01); C08K 3/08 (2013.01); *C08J 2369/00* (2013.01); *C08J 2451/04* (2013.01)

(58) Field of Classification Search
CPC .................................. C08K 3/08; C08L 69/00
See application file for complete search history.

(56) References Cited

U.S. PATENT DOCUMENTS

| 3,322,853 A | 5/1967 | Trementozzi et al. |
| 3,742,092 A | 6/1973 | Duke et al. |
| 3,839,513 A | 10/1974 | Patel |
| 3,898,300 A | 8/1975 | Hillard |
| 4,027,073 A | 5/1977 | Clark |
| 4,045,514 A | 8/1977 | Iwahashi et al. |
| 4,062,909 A | 12/1977 | Morgan et al. |
| 4,102,853 A | 7/1978 | Kawamura et al. |
| 4,117,041 A | 9/1978 | Guschl |
| 4,287,315 A | 9/1981 | Meyer et al. |
| 4,303,772 A | 12/1981 | Novicky |
| 4,391,935 A | 7/1983 | Bialous et al. |
| 4,400,333 A | 8/1983 | Neefe |
| 4,460,742 A | 7/1984 | Kishida et al. |
| 4,466,912 A | 8/1984 | Phillips et al. |
| 4,632,946 A | 12/1986 | Muench et al. |
| 4,634,734 A | 1/1987 | Hambrecht et al. |
| 4,652,614 A | 3/1987 | Eichenauer et al. |
| 4,659,790 A | 4/1987 | Shimozato et al. |
| 4,668,737 A | 5/1987 | Eichenauer et al. |
| 4,692,488 A | 9/1987 | Kress et al. |
| 4,745,029 A | 5/1988 | Kambour |
| 4,757,109 A | 7/1988 | Kishida et al. |
| 4,883,835 A | 11/1989 | Buysch et al. |
| 4,906,696 A | 3/1990 | Fischer et al. |
| 4,914,144 A | 4/1990 | Muehlbach et al. |
| 4,918,159 A | 4/1990 | Nakamura et al. |
| 4,983,658 A | 1/1991 | Kress et al. |
| 4,988,748 A | 1/1991 | Fuhr et al. |
| 4,997,883 A | 3/1991 | Fischer et al. |
| 5,025,066 A | 6/1991 | DeRudder et al. |
| 5,061,558 A | 10/1991 | Fischer et al. |
| 5,061,745 A | 10/1991 | Wittmann et al. |
| 5,091,470 A | 2/1992 | Wolsink et al. |
| 5,200,492 A | 4/1993 | Ohnaga et al. |
| 5,204,394 A | 4/1993 | Gosens et al. |
| 5,206,404 A | 4/1993 | Gunkel et al. |
| 5,218,030 A | 6/1993 | Katayose et al. |
| 5,219,907 A | 6/1993 | Niessner et al. |
| 5,229,443 A | 7/1993 | Wroczynski |
| 5,237,004 A | 8/1993 | Wu et al. |
| 5,239,001 A | 8/1993 | Fischer et al. |
| 5,274,031 A | 12/1993 | Eichenauer et al. |
| 5,280,070 A | 1/1994 | Drzewinski et al. |
| 5,284,916 A | 2/1994 | Drzewinski |
| 5,292,809 A | 3/1994 | Drzewinski et al. |
| 5,306,778 A | 4/1994 | Ishida et al. |
| 5,354,796 A | 10/1994 | Creecy et al. |
| 5,412,036 A | 5/1995 | Traugott et al. |
| 5,446,103 A | 8/1995 | Traugott et al. |

(Continued)

FOREIGN PATENT DOCUMENTS

| CA | 1 121 535 | 4/1982 |
| CN | 1377913 A | 11/2002 |

(Continued)

OTHER PUBLICATIONS

Extended Search Report in counterpart European Application No. 15194797.5 dated Mar. 18, 2016, pp. 1-7.
European Search Report in commonly owned European Application No. 08862371 dated Dec. 7, 2010, pp. 1-6.
International Search Report in commonly owned International Application No. PCT/KR2008/006870, dated May 28, 2009, pp. 1-2.
Office Action in commonly owned U.S. Appl. No. 12/631,018 dated Nov. 8, 2011, pp. 1-10.
Katrizky et al., "Correlation and Prediction of the Refractive Indices of Polymers by QSPR", Journal of Chemical Information and Computer Sciences, pp. 1171-1176, (1998).
Office Action in commonly owned U.S. Appl. No. 12/642,904 dated Dec. 14, 2011, pp. 1-9.
European Search Report in commonly owned European Application No. 09180634 dated Feb. 2, 2010, pp. 1-3.
Xu, "Prediction of Refractive Indices of Linear Polymers by a four-descriptor QSPR model", Polymer, 45 (2004) pp. 8651-8659.

(Continued)

*Primary Examiner* — Vickey Nerangis
(74) *Attorney, Agent, or Firm* — Additon, Higgins & Pendleton, P.A.

(57) ABSTRACT

A thermoplastic resin composition comprises (A) a polycarbonate resin; (B) a rubber-modified aromatic vinyl copolymer that includes a rubbery polymer having an average particle size of about 0.5 to about 20 µm; and (C) metal particles. A molded article can be prepared using the composition.

16 Claims, No Drawings

(56) References Cited

U.S. PATENT DOCUMENTS

| | | |
|---|---|---|
| 5,449,557 A | 9/1995 | Liebler et al. |
| 5,451,650 A | 9/1995 | Siol et al. |
| 5,473,019 A | 12/1995 | Siol et al. |
| 5,475,053 A | 12/1995 | Niessner et al. |
| 5,574,099 A | 11/1996 | Noro et al. |
| 5,605,962 A | 2/1997 | Suzuki et al. |
| 5,627,228 A | 5/1997 | Kobayashi |
| 5,635,565 A | 6/1997 | Miyajima et al. |
| 5,643,981 A | 7/1997 | Yang et al. |
| 5,672,645 A | 9/1997 | Eckel et al. |
| 5,731,390 A | 3/1998 | van Helmond et al. |
| 5,750,602 A | 5/1998 | Kohler et al. |
| 5,833,886 A | 11/1998 | Dashevsky et al. |
| 5,905,122 A | 5/1999 | Ohtsuka et al. |
| 5,955,184 A | 9/1999 | Honda et al. |
| 6,022,917 A | 2/2000 | Kobayashi |
| 6,063,889 A | 5/2000 | Friebe et al. |
| 6,083,428 A | 7/2000 | Ueda et al. |
| 6,111,024 A | 8/2000 | McKee et al. |
| 6,127,465 A | 10/2000 | Nodera |
| 6,174,945 B1 | 1/2001 | Kim et al. |
| 6,252,002 B1 | 6/2001 | Yamada et al. |
| 6,337,371 B2 | 1/2002 | Kurata et al. |
| 6,369,141 B1 | 4/2002 | Ishii et al. |
| 6,380,304 B1 | 4/2002 | Vanspeybroeck et al. |
| 6,423,767 B1 | 7/2002 | Weber et al. |
| 6,437,029 B1 | 8/2002 | Lim et al. |
| 6,528,559 B1 | 3/2003 | Nakacho et al. |
| 6,528,561 B1 | 3/2003 | Zobel et al. |
| 6,566,428 B1 | 5/2003 | Ecket et al. |
| 6,576,161 B2 | 6/2003 | Lim et al. |
| 6,595,825 B1 | 7/2003 | De Wilde |
| 6,596,794 B1 | 7/2003 | Ecket et al. |
| 6,596,893 B2 | 7/2003 | Nakacho et al. |
| 6,613,822 B1 | 9/2003 | Eckel et al. |
| 6,613,824 B2 | 9/2003 | Campbell et al. |
| 6,630,524 B1 | 10/2003 | Lim et al. |
| 6,646,068 B2 | 11/2003 | Chisholm et al. |
| 6,686,404 B1 | 2/2004 | Eckel et al. |
| 6,716,900 B2 | 4/2004 | Jang et al. |
| 6,762,228 B2 | 7/2004 | Seidel et al. |
| 6,849,689 B2 | 2/2005 | Yamada et al. |
| 6,890,979 B2 | 5/2005 | Eichenauer et al. |
| 6,914,089 B2 | 7/2005 | Eckel et al. |
| 6,956,072 B1 | 10/2005 | Kanaka et al. |
| 7,001,944 B2 | 2/2006 | Vathauer et al. |
| 7,067,188 B1 | 6/2006 | Yang et al. |
| 7,094,818 B2 | 8/2006 | Lim et al. |
| 7,294,659 B2 | 11/2007 | Yatake |
| 7,511,088 B2 | 3/2009 | Lim et al. |
| 7,550,523 B2 | 6/2009 | Lim et al. |
| 7,659,332 B2 | 2/2010 | Kang et al. |
| 7,732,515 B2 | 6/2010 | Jang et al. |
| 7,767,738 B2 | 8/2010 | Gaggar et al. |
| 7,956,127 B2 | 6/2011 | Lee et al. |
| 8,119,726 B2 | 2/2012 | Lim et al. |
| 8,304,494 B2 | 11/2012 | Park et al. |
| 8,557,912 B2 | 10/2013 | Chung et al. |
| 8,735,490 B2 | 5/2014 | Chung et al. |
| 9,090,767 B2 | 7/2015 | Park et al. |
| 9,365,671 B2 | 6/2016 | Kim et al. |
| 2001/0009946 A1 | 7/2001 | Catsman et al. |
| 2002/0042483 A1 | 4/2002 | Vanderbilt |
| 2002/0115759 A1 | 8/2002 | Eckel et al. |
| 2002/0115794 A1 | 8/2002 | Singh et al. |
| 2002/0151624 A1 | 10/2002 | Kobayashi |
| 2003/0139504 A1 | 7/2003 | Miebach et al. |
| 2004/0013882 A1 | 1/2004 | Gorny et al. |
| 2004/0097648 A1 | 5/2004 | Nakai et al. |
| 2004/0122139 A1 | 6/2004 | Yang et al. |
| 2004/0192814 A1 | 9/2004 | Yang et al. |
| 2004/0198877 A1 | 10/2004 | Yang et al. |
| 2004/0249027 A1 | 12/2004 | Lim et al. |
| 2004/0249070 A1 | 12/2004 | Lim et al. |
| 2005/0159533 A1 | 7/2005 | Nabeshima et al. |
| 2005/0245648 A1 | 11/2005 | Lim et al. |
| 2005/0253277 A1 | 11/2005 | Yamanaka et al. |
| 2006/0004154 A1 | 1/2006 | DeRudder et al. |
| 2006/0014863 A1 | 1/2006 | Lim et al. |
| 2006/0030647 A1 | 2/2006 | Ebeling et al. |
| 2006/0074148 A1 | 4/2006 | Ahn et al. |
| 2006/0100307 A1 | 5/2006 | Uerz et al. |
| 2007/0055017 A1 | 3/2007 | Schultes et al. |
| 2007/0100073 A1 | 5/2007 | Lee et al. |
| 2007/0155873 A1 | 7/2007 | Kang et al. |
| 2007/0249767 A1 | 10/2007 | Kang et al. |
| 2007/0249768 A1 | 10/2007 | Hong et al. |
| 2007/0287799 A1 | 12/2007 | Ha et al. |
| 2007/0295946 A1 | 12/2007 | Lim et al. |
| 2008/0182926 A1 | 7/2008 | Lim et al. |
| 2009/0054568 A1 | 2/2009 | Uejima et al. |
| 2009/0080079 A1 | 3/2009 | Kogure et al. |
| 2009/0093583 A1 | 4/2009 | Kawato et al. |
| 2009/0118402 A1 | 5/2009 | Jang et al. |
| 2010/0029855 A1 | 2/2010 | Matsuoka et al. |
| 2010/0152357 A1 | 6/2010 | Kwon et al. |
| 2010/0168272 A1 | 7/2010 | Park et al. |
| 2010/0168315 A1 | 7/2010 | Park et al. |
| 2010/0168354 A1 | 7/2010 | Hong et al. |
| 2010/0240831 A1 | 9/2010 | Kim et al. |
| 2010/0256288 A1 | 10/2010 | Kim et al. |
| 2011/0003918 A1 | 1/2011 | Eckel et al. |
| 2011/0009524 A1 | 1/2011 | Kwon et al. |
| 2011/0021677 A1 | 1/2011 | Kwon et al. |
| 2011/0040019 A1 | 2/2011 | Kwon et al. |
| 2011/0157866 A1 | 6/2011 | Li et al. |
| 2011/0159293 A1 | 6/2011 | Park et al. |
| 2011/0160377 A1 | 6/2011 | Chung et al. |
| 2011/0160380 A1 | 6/2011 | Kwon et al. |
| 2011/0230610 A1 | 9/2011 | Schultes et al. |
| 2012/0016068 A1 | 1/2012 | Chung et al. |
| 2013/0328149 A1 | 12/2013 | Okaniwa et al. |
| 2014/0187717 A1 | 7/2014 | Kwon et al. |
| 2014/0275366 A1 | 9/2014 | Chrino et al. |
| 2015/0152205 A1 | 6/2015 | Kim et al. |
| 2015/0216787 A1 | 8/2015 | Hori et al. |
| 2015/0376315 A1 | 12/2015 | Jang et al. |
| 2015/0376392 A1 | 12/2015 | Kim et al. |
| 2015/0376403 A1* | 12/2015 | Kwon ............... C08L 69/00 523/220 |

FOREIGN PATENT DOCUMENTS

| | | |
|---|---|---|
| CN | 101061179 A | 10/2007 |
| CN | 101768331 A | 7/2010 |
| CN | 102115564 A | 7/2011 |
| CN | 102153848 A | 8/2011 |
| CN | 102329462 A | 1/2012 |
| CN | 102974324 A | 3/2013 |
| CN | 104072659 A | 10/2014 |
| DE | 19614845 A1 | 10/1997 |
| DE | 196 32 675 A1 | 2/1998 |
| DE | 19801198 A1 | 7/1999 |
| DE | 10061081 A1 | 6/2002 |
| EP | 0107015 A1 | 5/1984 |
| EP | 0149813 | 7/1985 |
| EP | 0370344 A2 | 5/1990 |
| EP | 0 449 689 A1 | 10/1991 |
| EP | 0483717 A2 | 5/1992 |
| EP | 0 612 806 A1 | 8/1994 |
| EP | 0640655 A3 | 3/1995 |
| EP | 0 661 342 A1 | 7/1995 |
| EP | 0 700 968 A1 | 3/1996 |
| EP | 0721962 A2 | 7/1996 |
| EP | 0 728 811 A2 | 8/1996 |
| EP | 0 767 204 A2 | 4/1997 |
| EP | 0771852 A2 | 5/1997 |
| EP | 0 795 570 A1 | 9/1997 |
| EP | 0909790 A1 | 4/1999 |
| EP | 0 970 997 A2 | 1/2000 |
| EP | 1010725 A2 | 6/2000 |
| EP | 1 069 156 A1 | 1/2001 |
| EP | 1069154 A | 1/2001 |
| EP | 1117742 | 7/2001 |

(56) References Cited

FOREIGN PATENT DOCUMENTS

| | | |
|---|---|---|
| EP | 1209163 A1 | 5/2002 |
| EP | 2204412 A1 | 7/2010 |
| GB | 1042783 A1 | 9/1966 |
| JP | 59-149912 A | 8/1984 |
| JP | 59-202240 | 11/1984 |
| JP | 04-023856 A | 1/1992 |
| JP | 04-359954 A | 12/1992 |
| JP | 61 00785 | 1/1994 |
| JP | 06-100785 | 4/1994 |
| JP | 06-313089 A | 11/1994 |
| JP | 7-76649 | 3/1995 |
| JP | 08-012868 A | 1/1996 |
| JP | 8-208884 | 8/1996 |
| JP | 08-239544 A | 9/1996 |
| JP | 09-053009 A | 2/1997 |
| JP | 10-017762 A | 1/1998 |
| JP | 2000-154277 A1 | 6/2000 |
| JP | 2001-049072 A | 2/2001 |
| JP | 2001-226576 A | 8/2001 |
| JP | 2001-316580 A | 11/2001 |
| JP | 2002-080676 A | 3/2002 |
| JP | 2002-348457 A | 12/2002 |
| JP | 2005-247999 A | 9/2005 |
| JP | 2006-131833 A | 5/2006 |
| JP | 2006-249288 A | 9/2006 |
| JP | 2006-249292 A | 9/2006 |
| JP | 2006-257126 A | 9/2006 |
| JP | 2006-257284 A | 9/2006 |
| JP | 2006-342246 A | 12/2006 |
| JP | 2007-023227 | 2/2007 |
| JP | 2008-292853 A1 | 12/2008 |
| JP | 2014-040512 A | 3/2014 |
| KR | 1994-0014647 | 7/1994 |
| KR | 1996-14253 A | 5/1996 |
| KR | 1999-33150 A | 5/1999 |
| KR | 1999-47019 A | 7/1999 |
| KR | 2000 41992 A1 | 1/2000 |
| KR | 1020000009218 A | 2/2000 |
| KR | 10-2000-0048033 A | 7/2000 |
| KR | 1020000041993 A | 7/2000 |
| KR | 10-2000-0055347 A1 | 9/2000 |
| KR | 2001 109044 A1 | 12/2001 |
| KR | 2002 6350 A1 | 1/2002 |
| KR | 100360710 B | 10/2002 |
| KR | 2002 83711 A1 | 11/2002 |
| KR | 2001 107423 A1 | 12/2002 |
| KR | 1020020094345 A | 12/2002 |
| KR | 10-2003-0020584 A | 3/2003 |
| KR | 10-2003-0055443 A | 7/2003 |
| KR | 2003-0095537 A | 12/2003 |
| KR | 10-2004-0007788 A | 1/2004 |
| KR | 1020040058809 A | 7/2004 |
| KR | 2004-079118 A | 9/2004 |
| KR | 10-2006-0109470 A | 10/2006 |
| KR | 648114 B1 | 11/2006 |
| KR | 10-0666797 B1 | 1/2007 |
| KR | 10-0767428 B1 | 10/2007 |
| KR | 885819 B1 | 12/2007 |
| KR | 10-2008-0036790 A | 4/2008 |
| KR | 2009-0029539 A | 3/2009 |
| KR | 10-902352 | 6/2009 |
| KR | 10-2011-0079489 A | 7/2011 |
| KR | 10-2012-006839 A | 1/2012 |
| KR | 10-2012-0042026 A | 5/2012 |
| KR | 10-2012-0078417 A | 7/2012 |
| KR | 10-2013-0076616 A | 7/2013 |
| KR | 10-2013-0078747 | 7/2013 |
| WO | 99 19383 A1 | 4/1999 |
| WO | 99/57198 A1 | 11/1999 |
| WO | 00 00544 A1 | 1/2000 |
| WO | 00/06648 A1 | 2/2000 |
| WO | 00 09518 A1 | 2/2000 |
| WO | WO 00/06648 A1 * | 2/2000 |
| WO | 00/18844 A1 | 4/2000 |
| WO | 01/66634 A | 9/2001 |
| WO | 02 46287 A1 | 6/2002 |
| WO | 03/020827 A1 | 3/2003 |
| WO | 03/022928 A1 | 3/2003 |
| WO | 03/042303 A1 | 5/2003 |
| WO | 03/042305 A1 | 5/2003 |
| WO | 2004/007611 A1 | 1/2004 |
| WO | 2006 041237 A1 | 4/2006 |
| WO | 2007/004434 | 1/2007 |
| WO | 2007/119920 A1 | 10/2007 |
| WO | 2007/140101 A1 | 12/2007 |
| WO | 2008/081791 A1 | 7/2008 |
| WO | 2009/078593 A1 | 6/2009 |
| WO | 2009/078602 A1 | 6/2009 |
| WO | 2009/113762 A2 | 9/2009 |
| WO | 2009/116722 A1 | 9/2009 |
| WO | 2009/128601 A | 10/2009 |

OTHER PUBLICATIONS

European Search Report in commonly owned European Application No. 10196806 dated Apr. 27, 2011, pp. 1-5.
Office Action in commonly owned U.S. Appl. No. 12/631,018 dated Apr. 26, 2012, pp. 1-12.
Office Action in commonly owned U.S. Appl. No. 12/642,904 dated Mar. 27, 2012, pp. 1-7.
Notice of Allowance in commonly owned U.S. Appl. No. 12/642,904 dated Jul. 2, 2012, pp. 1-8.
Office Action in commonly owned U.S. Appl. No. 12/817,302 dated Mar. 29, 2012, pp. 1-5.
Office Action in commonly owned U.S. Appl. No. 12/884,549 dated Aug. 21, 2012, pp. 1-12.
Mark, Physical Properties of Polymers Handbook, 2nd Edition, Polymer Research Center and Department of Chemistry, University of Cincinnati, OH, (2007) Springer, pp. 5-7.
Polysciences, Inc., data sheet for benzyl acrylate, no date, pp. 1-2.
Guidechem, data sheet for RUBA-93, no date, pp. 1-2.
European Search Report in commonly owned European Application No. 08873329.0 dated Dec. 14, 2012, pp. 1-7.
Office Action in commonly owned U.S. Appl. No. 12/972,795 dated Jan. 18, 2013, pp. 1-9.
International Search Report in commonly owned International Application No. PCT/KR2008/07825 dated Aug. 28, 2009, pp. 1-2.
Machine translation of JP 2006-257284, pp. 1-27 (2006).
Office Action in commonly owned U.S. Appl. No. 12/880,209 dated Feb. 16, 2011, pp. 1-10.
International Search Report in commonly owned International Application No. PCT/KR2008/07820 dated Jul. 28, 2009, pp. 1-2.
Final Office Action in commonly owned U.S. Appl. No. 12/880,209 dated Jul. 29, 2011, pp. 1-9.
Advisory Action in commonly owned U.S. Appl. No. 12/880,209 dated Nov. 4, 2011, pp. 1-4.
International Search Report in commonly owned International Application No. PCT/KR2008/007157, dated May 28, 2009.
Final Office Action in commonly owned U.S. Appl. No. 12/792,176 dated Apr. 19, 2012, pp. 1-10.
Advisory Action in commonly owned U.S. Appl. No. 12/792,176 dated Aug. 23, 2012, pp. 1-4.
European Search Report in commonly owned European Application No. 08873425.6 dated May 29, 2012, pp. 1-5.
Notice of Allowance in commonly owned U.S. Appl. No. 12/880,209 dated Oct. 10, 2013, pp. 1-10.
Paris et al., "Glass Transition Temperature of Allyl Methacrylate-n-Butyl Acrylate Gradient Copolymers in Dependence on Chemical Composition and Molecular Weight", Journal of Polymer Science, Part A (2007) pp. 1-11.
Wunderlich, "Thermal Analysis of Polymeric Materials", Springer, New York, US (2005) pp. 1-5.
Non-Final Office Action in commonly owned U.S. Appl. No. 14/749,861 dated Jan. 9, 2017, pp. 1-8.
Search Report in commonly owned European Patent Application No. EP 01 27 4302 dated Mar. 4, 2005, pp. 1-4.
Office Action in commonly owned U.S. Appl. No. 11/768,592 dated Apr. 8, 2009, pp. 1-9.

(56) References Cited

OTHER PUBLICATIONS

Notice of Allowance in commonly owned U.S. Appl. No. 11/647,101 dated Dec. 29, 2008, pp. 1-7.
International Search Report in commonly owned International Application No. PCT/KR2006/005752, dated Mar. 27, 2007, pp. 1-2.
International Search Report dated Jul. 14, 2005 in commonly owned international publication No. PCT/KR2004/003457, pp. 1.
International Preliminary Report on Patentability dated Jan. 25, 2007 in commonly owned international publication No. PCT/KR2004/003457, pp. 1-23.
Office Action in commonly owned U.S. Appl. No. 12/961,877 dated Jul. 30, 2012, pp. 1-14.
European Search Report in commonly owned European Application No. 14194463.7 dated Apr. 23, 2015, pp. 1-2.
Baek et al., electronic translation of KR 10-666797, Jan. 2007, pp. 1-6.
Non-Final Office Action in commonly owned U.S. Appl. No. 14/097,538 dated Mar. 26, 2015, pp. 1-11.
Non-Final Office Action in commonly owned U.S. Appl. No. 14/097,538 dated Aug. 11, 2015, pp. 1-6.
Final Office Action in commonly owned U.S. Appl. No. 14/097,538 dated Nov. 23, 2015, pp. 1-7.
Notice of Allowance in commonly owned U.S. Appl. No. 14/097,538 dated Mar. 30, 2016, pp. 1-9.
Extended Search Report in commonly owned European Application No. 15194797.5 dated Mar. 18, 2016, pp. 1-7.
Non-Final Office Action in commonly owned U.S. Appl. No. 14/749,861 dated Nov. 20, 2015, pp. 1-17.
Final Office Action in commonly owned U.S. Appl. No. 14/747,207 dated Dec. 5, 2016, pp. 1-8.
Non-Final Office Action in commonly owned U.S. Appl. No. 14/750,364 dated Jun. 16, 2016, pp. 1-7.
Notice of Allowance in commonly owned U.S. Appl. No. 14/750,364 dated Oct. 6, 2016, pp. 1-8.
Non-Final Office Action in commonly owned U.S. Appl. No. 14/748,576 dated Feb. 16, 2016, pp. 1-9.
Notice of Allowance in commonly owned U.S. Appl. No. 14/748,576 dated Jun. 29, 2016, pp. 1-9.
Final Office Action in commonly owned U.S. Appl. No. 14/749,861 dated May 31, 2016, pp. 1-9.
Notice of Allowance in commonly owned U.S. Appl. No. 14/749,861 dated Aug. 25, 2016, pp. 1-7.
Non-Final Office Action in commonly owned U.S. Appl. No. 14/557,478 dated Jun. 4, 2015, pp. 1-9.
Final Office Action in commonly owned U.S. Appl. No. 14/557,478 dated Oct. 30, 2015, pp. 1-6.
Notice of Allowance in commonly owned U.S. Appl. No. 14/557,478 dated Feb. 18, 2016, pp. 1-5.
Non-Final Office Action in commonly owned U.S. Appl. No. 14/747,176 dated Apr. 11, 2016, pp. 1-8.
Final Office Action in commonly owned U.S. Appl. No. 14/747,176 dated Jul. 27, 2016, pp. 1-6.
Notice of Allowance in commonly owned U.S. Appl. No. 14/747,176 dated Oct. 7, 2016, pp. 1-6.
Office Action in commonly owned U.S. Appl. No. 14/747,207, dated Aug. 2, 2016, pp. 1-17.
European Search Report for commonly owned European Application No. EP 04808586, completed on Sep. 25, 2007.
Advisory Action in commonly owned U.S. Appl. No. 12/631,018 dated Nov. 7, 2012, pp. 1-3.
Final Office Action in commonly owned U.S. Appl. No. 12/817,302 dated Feb. 7, 2013, pp. 1-6.
Final Office Action in commonly owned U.S. Appl. No. 12/884,549 dated Dec. 18, 2012, pp. 1-7.
Notice of Allowance in commonly owned U.S. Appl. No. 12/884,549 dated Apr. 11, 2013, pp. 1-8.
European Search Report in commonly owned European Application No. 07024808, dated Mar. 18, 2008, pp. 1-2.
Machine Translation of JP 10-017762 (2011).
Derwent Abstract of JP 2002348457 (A) (2003).
Full English Translation of JP-10-017762 (2011).
Advisory Action in commonly owned U.S. Appl. No. 12/817,302 dated May 16, 2013, pp. 1-5.
Office Action in commonly owned U.S. Appl. No. 12/898,012 dated Dec. 21, 2012, pp. 1-6.
Notice of Allowance in commonly owned U.S. Appl. No. 12/972,795 dated May 24, 2013, pp. 1-8.
European Search Report in commonly owned European Application No. 10194938.6 dated Jul. 21, 2011, pp. 1-5.
Notice of Allowance in commonly owned U.S. Appl. No. 12/961,877 dated Jun. 19, 2013, pp. 1-10.
Final Office Action in commonly owned U.S. Appl. No. 12/961,877 dated Nov. 28, 2012, pp. 1-10.
Advisory Action in commonly owned U.S. Appl. No. 12/961,877 dated Mar. 12, 2013, pp. 1-2.
Silicones: An Introduction to Their Chemistry and Application, The Plastics Institute 1962, p. 27.
Extended European Search Report in commonly owned European Application No. 09180865.9, dated Apr. 16, 2010.
Office Action in counterpart Chinese Application No. 2015107925883 dated Mar. 10, 2017, pp. 1-7.
Office Action in commonly owned Chinese Application No. 201510364557.8 dated Mar. 31, 2017, pp. 1-6.
Office Action in commonly owned U.S. Appl. No. 14/747,207 dated Jul. 25, 2017, pp. 1-9.

\* cited by examiner

THERMOPLASTIC RESIN COMPOSITION AND MOLDED ARTICLE MADE USING THE SAME

CROSS-REFERENCE TO RELATED APPLICATION

This application claims the benefit of priority under 35 U.S.C. §119(a) of Korean Patent Application No. 10-2014-0160794, filed on Nov. 18, 2014, in the Korean Intellectual Property Office, the entire disclosure of which is incorporated herein by reference for all purposes.

FIELD

The present invention relates to a thermoplastic resin composition and a molded article made using the same.

BACKGROUND

Thermoplastic resins have a lower specific gravity than glass or metal and can have excellent mechanical physical properties such as excellent moldability and impact resistance. Plastic products made using such thermoplastic resins are quickly replacing conventional glass and metal products in fields such as electric and electronic products and automobile components.

Recently, there is a growing demand by users for an environmentally-friendly non-painted resin, as well as a growing demand by users for a metallic resin with a metallic like appearance imparted thereto by the resin itself without a coating process. Also, materials with low gloss or no gloss are increasingly being used in plastic materials for interior and exterior automobile components, in order to provide a luxurious appearance and touch.

A metallic appearance can be imparted to a resin without a coating process by adding metal particles to a resin composition. However, there can be appearance problems caused by flow-marks or weld-lines caused by the metal particles after an injection molding. Also, a mold should be additionally changed or the application is limited.

In order to solve these problems, Korean patent laid-open publication No. 2013-0078747 discusses controlling the shape or the aspect ratio of a metal particle. Also there is research directed to improving a surface coating material for a metal particle. However, even though these can provide some improvements, there also can be a limit on improving appearance problems, such as flow-marks or weld-lines caused by non-uniformity, agglomeration, and/or orientation of metal particles after an injection molding.

Therefore, in order to resolve the aforementioned problems, there is a growing need to develop a thermoplastic resin composition providing excellent appearance and physical properties such as impact resistance, light stability and the like, by controlling the degree of gloss and the shielding ability of a material itself.

SUMMARY

Therefore, a purpose of various embodiments of the present disclosure is to provide a thermoplastic resin composition that is capable of exhibiting excellent physical properties such as impact resistance, light stability and the like and can provide excellent appearance by minimizing appearance problems due to the orientation and/or non-uniformity of metal particles by controlling the degree of gloss and the shielding ability of the resin composition, by adding a rubber-modified aromatic vinyl copolymer comprising a rubbery polymer having an optimized average particle size into a composition comprising polycarbonate resin and metal particles in the optimum ratio, and a molded article manufactured from the same.

In order to achieve the above-described purposes, exemplary embodiments include a thermoplastic resin composition comprising (A) a polycarbonate resin, (B) a rubber-modified aromatic vinyl copolymer, and (C) metal particles.

The rubber-modified aromatic vinyl copolymer (B) may comprise a rubbery polymer having an average particle size of about 0.5 to about 20 µm.

The rubber-modified aromatic vinyl copolymer (B) may include a first rubber-modified aromatic vinyl copolymer (B-1) which comprises a rubbery polymer having an average particle size of about 0.5 to about 20 µm, and further include a second rubber-modified aromatic vinyl copolymer (B-2) which comprises a rubbery polymer having an average particle size of about 0.1 to less than about 0.5 µm.

The rubber-modified aromatic vinyl copolymer (B) may include about 30 to about 100 weight % of the first rubber-modified aromatic vinyl copolymer (B-1) and 0 to about 70 weight % of the second rubber-modified aromatic vinyl copolymer (B-2).

The first rubber-modified aromatic vinyl copolymer (B-1) may comprise about 5 to about 30 weight % of the rubbery polymer based on about 100 weight % of the first rubber-modified aromatic vinyl copolymer (B-1). Further, the second rubber-modified aromatic vinyl copolymer (B-2) may comprise about 30 to about 80 weight % of the rubbery polymer based on about 100 weight % of the second rubber-modified aromatic vinyl copolymer (B-2).

The average particle size of the metal particles (C) may be about 5 to about 100 µm.

The thermoplastic resin composition of the present disclosure may further comprise an aromatic vinyl copolymer (D).

The thermoplastic resin composition of the present disclosure may comprise about 30 to about 90 weight % of the polycarbonate resin (A), about 10 to about 70 weight % of the rubber-modified aromatic vinyl copolymer (B), each based on about 100 weight % of the polycarbonate resin (A) and the rubber-modified aromatic vinyl copolymer (B), and about 0.1 to about 5 parts by weight of the metal particles (C) based on about 100 parts by weight of the polycarbonate resin (A) and the rubber-modified aromatic vinyl copolymer (B).

Furthermore, the thermoplastic resin composition of the present disclosure may comprise about 30 to about 80 weight % of the polycarbonate resin (A), about 10 to about 60 weight % of the rubber-modified aromatic vinyl copolymer (B), and about 1 to about 50 weight % of the aromatic vinyl copolymer (D), each based on about 100 weight % of the polycarbonate resin (A), the rubber-modified aromatic vinyl copolymer (B) and the aromatic vinyl copolymer (D), and about 0.1 to about 5 parts by weight of the metal particles (C) based on about 100 parts by weight of the polycarbonate resin (A), the rubber-modified aromatic vinyl copolymer (B) and the aromatic vinyl copolymer (D).

The thermoplastic resin composition of the present disclosure may further include one or more additives (E). In exemplary embodiments, the additives (E) may include, but are not limited to, flame retardant, lubricant, plasticizer, heat stabilizer, antioxidant, light stabilizer, UV absorbent, releasing agent, colorant, and the like, and combinations thereof.

Exemplary embodiments further include a molded article manufactured using the thermoplastic resin composition. The molded article can have excellent appearance properties.

The molded article may have a degree of gloss of about 20 to about 80 GU, which is measured at an angle of 60° by the evaluation method according to ASTM D523.

The molded article may have a ΔE value of about 3.0 or less after exposure to 2,400 kJ/m$^2$ measured by the evaluation method according to FLTM BO 116-01.

Furthermore, the molded article may have a ΔE value of about 3.0 or less after exposure to 1,050 kJ/m$^2$ measured by the evaluation method according to SAE J 1885.

In various exemplary embodiments, it can be possible to provide a thermoplastic resin composition and a molded article made from the resin composition, which can exhibit excellent impact resistance and light stability, and also implement excellent appearance by minimizing the appearance problems caused by the orientation and/or non-uniformity of metal particles by controlling the degree of gloss and the shielding ability of the resin composition, by adding a rubber-modified aromatic vinyl copolymer comprising a rubbery polymer having an optimized average particle size into a composition comprising polycarbonate resin and metal particles in the optimum ratio.

DETAILED DESCRIPTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Furthermore, a singular form may include a plural from as long as it is not specifically mentioned in a sentence. Furthermore, "include/comprise" or "including/comprising" used in the specification represents that one or more components, steps, operations, and elements exist or are added.

Furthermore, unless defined otherwise, all the terms used in this specification including technical and scientific terms have the same meanings as would be generally understood by those skilled in the related art. The terms defined in generally used dictionaries should be construed as having the same meanings as would be construed in the context of the related art, and unless clearly defined otherwise in this specification, should not be construed as having idealistic or overly formal meanings.

Hereinbelow, explanation will be made on a thermoplastic resin composition according to the present disclosure and a molded article using the same.

The present invention relates to a thermoplastic resin composition that can have excellent appearance properties and a molded article manufactured by the same.

First, the thermoplastic resin composition according to the present disclosure may comprise a polycarbonate resin (A), rubber-modified aromatic vinyl copolymer (B), and metal particles (C). In exemplary embodiments, the thermoplastic resin composition of the present disclosure may comprise a polycarbonate resin (A), rubber-modified aromatic vinyl copolymer (B), metal particles (C), and aromatic vinyl copolymer (D). These components can provide excellent metal particle shielding property, impact resistance, light stability and the like. Each of these components will be explained in detail hereinbelow.

The thermoplastic resin composition of the present disclosure may comprise about 30 to about 90 weight % of the polycarbonate resin (A), about 10 to about 70 weight % of the rubber-modified aromatic vinyl copolymer (B), each based on about 100 weight % of the polycarbonate resin (A) and the rubber-modified aromatic vinyl copolymer (B), and about 0.1 to about 5 parts by weight of the metal particles (C) based on about 100 parts by weight of the polycarbonate resin (A) and the rubber-modified aromatic vinyl copolymer (B).

In exemplary embodiments, the thermoplastic resin composition of the present disclosure may comprise about 50 to about 90 weight % of the polycarbonate resin (A), about 10 to about 50 weight % of the rubber-modified aromatic vinyl copolymer (B), each based on about 100 weight % of the polycarbonate resin (A) and the rubber-modified aromatic vinyl copolymer (B), and about 0.1 to about 2 parts by weight of the metal particles (C) based on about 100 parts by weight of the polycarbonate resin (A) and the rubber-modified aromatic vinyl copolymer (B). The appearance properties, impact resistance, light stability, and the like may be maximized in the above-described amount ratios.

Furthermore, the thermoplastic resin composition of the present disclosure may further comprise the aromatic vinyl copolymer (D). In exemplary embodiments, the thermoplastic resin composition of the present disclosure may comprise about 30 to about 80 weight % of the polycarbonate resin (A), about 10 to about 60 weight % of the rubber-modified aromatic vinyl copolymer (B), and about 1 to about 50 weight % of the aromatic vinyl copolymer (D), each based on about 100 weight % of the polycarbonate resin (A), the rubber-modified aromatic vinyl copolymer (B) and the aromatic vinyl copolymer (D), and about 0.1 to about 5 parts by weight of the metal particles (C) based on about 100 parts by weight of the polycarbonate resin (A), the rubber-modified aromatic vinyl copolymer (B) and the aromatic vinyl copolymer (D).

In exemplary embodiments, the thermoplastic resin composition of the present disclosure may comprise about 50 to about 80 weight % of the polycarbonate resin (A), about 10 to about 40 weight % of the rubber-modified aromatic vinyl copolymer (B), and about 1 to about 30 weight % of the aromatic vinyl copolymer (D), each based on about 100 weight % of the polycarbonate resin (A), the rubber-modified aromatic vinyl copolymer (B) and the aromatic vinyl copolymer (D), and about 0.1 to about 2 parts by weight of the metal particles (C) based on about 100 parts by weight of the polycarbonate resin (A), the rubber-modified aromatic vinyl copolymer (B) and the aromatic vinyl copolymer (D).

In some embodiments, the thermoplastic resin composition may comprise the polycarbonate resin (A) in an amount of about 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 weight %, based on about 100 weight % of the polycarbonate resin (A) and the rubber-modified aromatic vinyl copolymer (B). Further, according to some embodiments of the present invention, the amount of polycarbonate resin (A) can be in a range from about any of the foregoing amounts to about any other of the foregoing amounts.

In some embodiments, the thermoplastic resin composition may comprise the rubber-modified aromatic vinyl copolymer (B) in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70 weight %, based on about 100 weight % of the polycarbonate resin (A) and the rubber-modified aromatic vinyl copolymer (B). Further, according to some embodiments of the present invention, the amount of rubber-modified aromatic vinyl copolymer (B) can be in a range from about any of the foregoing amounts to about any other of the foregoing amounts.

In some embodiments, the thermoplastic resin composition may comprise the metal particles (C) in an amount of about 0.1, 0.2, 0.3, 0.4, 0.5, 0.6, 0.7, 0.8, 0.9, 1, 2, 3, 4, or 5 parts by weight. Further, according to some embodiments of the present invention, the amount of metal particles (C) can be in a range from about any of the foregoing amounts to about any other of the foregoing amounts.

(A) Polycarbonate Resin

The polycarbonate resin used in the present disclosure may be an aromatic polycarbonate resin produced by reacting a diphenol represented by the following Chemical Formula with phosgene, halogen formate, and/or carbonic acid diester.

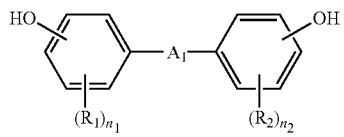

wherein, $A_1$ is a single bond, substituted or unsubstituted $C_1$ to $C_5$ alkylene, substituted or unsubstituted $C_1$ to $C_5$ alkylidene, substituted or unsubstituted $C_3$ to $C_6$ cycloalkylene, substituted or unsubstituted $C_5$ to $C_6$ cycloalkylidene, CO, S, or $SO_2$; each of $R_1$ and $R_2$ is the same or different and each is independently substituted or unsubstituted $C_1$ to $C_{30}$ alkyl or substituted or unsubstituted $C_6$ to $C_{30}$ aryl; and each of $n_1$ and $n_2$ is the same or different and each is independently an integer of 0 to 4.

As used herein, unless otherwise defined, the term "substituted" means that a hydrogen atom has been substituted by a halogen radical, $C_1$ to $C_{30}$ alkyl, $C_1$ to $C_{30}$ haloalkyl, $C_6$ to $C_{30}$ aryl, $C_2$ to $C_{30}$ heteroaryl, $C_1$ to $C_{20}$ alkoxy, or a combination thereof. Also as used herein, unless otherwise defined, the term "hetero" refers to a nitrogen, sulfur, oxygen, and/or phosphorus atom in place of a carbon atom.

Examples of the diphenol may include without limitation hydroquinone, resorcinol, 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane, 2,2-bis-(3-chloro-4-hydroxyphenyl)-propane, 2,2-bis-(3,5-dichloro-4-hydroxyphenyl)-propane, 2,2-bis-(3-methyl-4-hydroxyphenyl)-propane, 2,2-bis-(3,5-dimethyl-4-hydroxyphenyl)-propane, and the like, and mixtures thereof. In exemplary embodiments, 2,2-bis-(4-hydroxyphenyl)-propane, 2,2-bis-(3,5-dichloro-4-hydroxyphenyl)-propane, 2,2-bis-(3-methyl-4-hydroxyphenyl)-propane, 2,2-bis-(3,5-dimethyl-4-hydroxyphenyl)-propane and/or 1,1-bis-(4-hydroxyphenyl)-cyclohexane may be used. For example, 2,2-bis-(4-hydroxyphenyl)-propane (also called bisphenol-A) may be used.

The polycarbonate resin used in the present disclosure may have a weight average molecular weight (Mw) measured by Gel Permeation Chromatography (GPC) using polystyrene as a standard sample of about 10,000 to about 50,000 g/mol, for example, a weight average molecular weight (Mw) of about 15,000 to about 40,000 g/mol, but the present invention is not limited thereto.

The polycarbonate resin may be a polycarbonate resin having a branched-chain. For example, the polycarbonate resin may be produced by adding a tri- or higher multifunctional compound, for example, a compound with trivalent or more phenol radicals, in an amount of about 0.05 to about 2 mol % based on the total mol % of diphenols used in the polymerization of polycarbonate resin.

The polycarbonate resin used in the present disclosure may include a homopolycarbonate resin and/or a copolycarbonate resin. Also, a blend of one or more copolycarbonate resins and/or one or more homopolycarbonate resins may be used.

Some or an entirety of the aforementioned polycarbonate resin of the present disclosure may be replaced by an aromatic polyester-carbonate resin obtained through a polymerization reaction in the presence of an ester precursor, for example, a difunctional carboxylic acid.

(B) Rubber-Modified Aromatic Vinyl Copolymer

The rubber-modified aromatic vinyl copolymer used in the present disclosure may be a resin polymer in which a grafted rubbery polymer exists as dispersed particles in a matrix (continuous phase) including a copolymer of an aromatic vinyl compound and a vinyl compound that may be copolymerized with the aromatic vinyl compound. In addition, such a rubber-modified aromatic vinyl copolymer may be a grafted copolymer produced by adding an aromatic vinyl compound and a vinyl compound that may be copolymerized with the aromatic vinyl compound in the presence of a rubbery polymer, and graft-copolymerizing the same, and may include the grafted rubbery polymer. Such a rubber-modified aromatic vinyl copolymer may be produced by known polymerization methods such as emulsion polymerization, solution polymerization, suspension polymerization, and mass polymerization.

In general, the rubber-modified aromatic vinyl copolymer including the grafted rubbery polymer being dispersed in the form of particles may be produced by producing a grafted rubbery polymer with a high content of a rubbery polymer and an aromatic vinyl copolymer with no rubbery polymer separately, and then melting/mixing them in a suitable manner according to the purpose of use. However, when using the mass polymerization method, the rubber-modified aromatic vinyl copolymer including the grafted rubbery polymer being dispersed in the form of particles may be produced through a continuous reaction process at one time without producing the grafted rubbery polymer and the aromatic vinyl copolymer separately and melting/mixing them.

Examples of the rubber-modified aromatic vinyl copolymer used in the present disclosure may include without limitation an acrylonitrile-butadiene-styrene copolymer (ABS), acrylonitrile-styrene-acrylate copolymer (ASA), acrylonitrile-ethylene propylene rubber-styrene copolymer (AES), methyl methacrylate-butadiene-styrene copolymer (MBS), and the like, and mixtures thereof.

Examples of the rubbery polymer that may be used in the rubber-modified aromatic vinyl copolymer may include without limitation diene rubbery polymers such as polybutadiene, styrene-butadiene copolymer, acrylonitrile-butadiene copolymer and the like; saturated rubbery polymers which are hydrogenated diene rubber polymers; isoprene rubbery polymers; acrylic-based rubbery polymers such as butyl acrylate and the like; ethylene/propylene/diene monomer ternary copolymers (EPDM) and the like, and mixtures thereof. In exemplary embodiments, the rubbery polymer may include polybutadiene which is a diene rubber polymer.

The rubber-modified aromatic vinyl copolymer may include a rubbery polymer having the average particle size of about 0.5 to about 20 μm, for example, about 0.5 to about 15 μm, and as another example about 0.7 to about 10 μm. The above-described particle size is an optimized particle size to improve a degree of gloss and a shielding effect of a thermoplastic resin composition comprising the rubber-modified aromatic vinyl copolymer. The thermoplastic resin composition including the same can thus exhibit excellent impact resistance and light stability, and also can exhibit excellent appearance by minimizing the appearance problems caused by the orientation and/or non-uniformity of metal particles in a molded article made from the resin composition.

Herein, the particle size may be expressed by an average size of a group, the average size being digitized by a measurement method, but there are also a mode diameter that represents a maximum value of a distribution, a median diameter that corresponds to a median value of an integral calculus distribution curve, and various average diameters (number average, length average, area average, mass average, volume average and the like) that are more commonly used. In the present disclosure, however, an average particle size refers to a number average diameter that is a measurement of D50 (a particle size of the point where the distribution rate is 50%) unless expressed otherwise.

Examples of the aromatic vinyl compound that may be graft-copolymerized with the rubber polymer may include without limitation styrene, α-methylstyrene, β-methylstyrene, p-methylstyrene, p-t-butylstyrene, ethylstyrene, vinylxylene, monochlorostyrene, dichlorostyrene, dibromostyrene, vinylnaphthalene, and the like, and combinations thereof. In exemplary embodiments, the aromatic vinyl compound may include styrene.

Examples of the vinyl compound that may be copolymerized with the aromatic vinyl compound may include without limitation acrylonitrile, methacrylonitrile, fumaronitrile, methacrylic acid alkyl esters, acrylic acid alkyl esters, maleic anhydride, alkyl and/or phenyl nucleus-substituted maleimide, and the like, and combinations thereof. Here, the term alkyl means $C_1$ to $C_8$ alkyl. In exemplary embodiments, the vinyl compound may include acrylonitrile.

Furthermore, the rubber-modified aromatic vinyl copolymer (B) may include a first rubber-modified aromatic vinyl copolymer (B-1) and a second rubber-modified aromatic vinyl copolymer (B-2).

The rubber-modified aromatic vinyl copolymer (B) may include about 30 to about 100 weight % of the first rubber-modified aromatic vinyl copolymer (B-1) and 0 to about 70 weight % of the second rubber-modified aromatic vinyl copolymer (B-2).

In exemplary embodiments, the rubber-modified aromatic vinyl copolymer (B) may include about 50 to about 99 weight % of the first rubber-modified aromatic vinyl copolymer (B-1) and about 1 to about 50 weight % of the second rubber-modified aromatic vinyl copolymer (B-2). For example, the rubber-modified aromatic vinyl copolymer (B) may include about 70 to about 95 weight % of the first rubber-modified aromatic vinyl copolymer (B-1) and about 5 to about 30 weight % of the second rubber-modified aromatic vinyl copolymer (B-2).

Within the above range, it is possible to implement excellent appearance and physical properties of the molded article made from the thermoplastic resin composition.

In some embodiments, the rubber-modified aromatic vinyl copolymer (B) may include about 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99 or 100 weight % of the first rubber-modified aromatic vinyl copolymer (B-1). Further, according to some embodiments of the present invention, the amount of first rubber-modified aromatic vinyl copolymer (B-1) can be in a range from about any of the foregoing amounts to about any other of the foregoing amounts.

In some embodiments, the rubber-modified aromatic vinyl copolymer (B) may include the second rubber-modified aromatic vinyl copolymer (B-2) in an amount of 0 (the second rubber-modified aromatic vinyl copolymer (B-2) is not present), about 0 (the second rubber-modified aromatic vinyl copolymer (B-2) is present), 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70 weight %. Further, according to some embodiments of the present invention, the amount of second rubber-modified aromatic vinyl copolymer (B-2) can be in a range from about any of the foregoing amounts to about any other of the foregoing amounts.

(B-1) First Rubber-Modified Aromatic Vinyl Copolymer

The first rubber-modified aromatic vinyl copolymer (B-1) may include a rubbery polymer having an average particle size of about 0.5 to about 20 μm. The first rubber-modified aromatic vinyl copolymer includes a rubbery polymer having a relatively larger particle size, and thereby may control a degree of gloss of a thermoplastic composition comprising the same, and improve the shielding property of metal particles (C) and the appearance properties of a molded article made from the thermoplastic composition without use of an additional matting agent and/or change of the metal particles.

The average particle size of the rubbery polymer may be about 0.5 to about 20 μm, for example about 0.5 to about 15 μm, and as another example about 0.7 to about 10 μm. In some embodiments, the average particle size of the rubbery polymer may be about 0.5, 0.6, 0.7, 0.8, 0.9, 1, 2, 3, 4, 5, 6, 7, 8, 9, 10, 11, 12, 13, 14, 15, 16, 17, 18, 19, or 20 μm.

When the average particle size of the rubbery polymer is less than about 0.5 μm, the shielding property of metal particles and the effect of controlling the degree of gloss of the thermoplastic resin composition can be significantly deteriorated. When the average particle size of the rubbery polymer exceeds about 20 μm, a metallic appearance of the molded article can be deteriorated.

The first rubber-modified aromatic vinyl copolymer (B-1) may include about 5 to about 30 weight % of the rubbery polymer based on about 100 weight % of the first rubber-modified aromatic vinyl copolymer (B-1). In exemplary embodiments, the first rubber-modified aromatic vinyl copolymer (B-1) may include about 5 to about 20 weight %, for example about 7 to about 20 weight %, of the rubbery polymer based on about 100 weight % of the first rubber-modified aromatic vinyl copolymer (B-1). When the amount of the rubbery polymer is less than about 5 weight %, the effect for improving an impact resistance can be deteriorated. When the amount of the rubbery polymer exceeds about 30 weight %, mechanical physical properties and molding processability of the thermoplastic composition can be deteriorated.

In some embodiments, the first rubber-modified aromatic vinyl copolymer (B-1) may include about 5, 6, 7, 8, 9, 10, 11, 12, 13, 14, 15, 16, 17, 18, 19, 20, 21, 22, 23, 24, 25, 26, 27, 28, 29, or 30 weight % of the rubbery polymer based on about 100 weight % of the first rubber-modified aromatic vinyl copolymer (B-1). Further, according to some embodiments of the present invention, the amount of rubbery polymer can be in a range from about any of the foregoing amounts to about any other of the foregoing amounts.

Further, the first rubber-modified aromatic vinyl copolymer (B-1) may be used as a combination of two or more types having the different average particle sizes and amounts of the rubbery polymer.

(B-2) Second Rubber-Modified Aromatic Vinyl Copolymer

The second rubber-modified aromatic vinyl copolymer (B-2) may include a rubbery polymer having an average particle size of about 0.1 to less than about 0.5 µm. The second rubber-modified aromatic vinyl copolymer (B-2) may play a role of improving appearance and/or physical properties such as impact resistance like the first rubber-modified aromatic vinyl copolymer (B-1).

The average particle size of the rubbery polymer may be about 0.1 to less than about 0.5 µm, for example about 0.1 to about 0.4 µm. In some embodiments, the average particle size of the rubbery polymer may be about 0.1, 0.2, 0.3, or 0.4 µm.

When the average particle size of the rubbery polymer is less than about 0.1 µm, or is or exceeds about 0.5 µm, the improvement efficiency of impact resistance can be significantly deteriorated.

The second rubber-modified aromatic vinyl copolymer (B-2) may include about 30 to about 80 weight % of the rubbery polymer based on about 100 weight % of the second rubber-modified aromatic vinyl copolymer (B-2). In exemplary embodiments, the second rubber-modified aromatic vinyl copolymer (B-2) may include about 40 to about 70 weight % of the rubbery polymer based on about 100 weight % of the second rubber-modified aromatic vinyl copolymer (B-2). When the amount of the rubbery polymer is less than about 30 weight %, the effect for improving an impact resistance can be insufficient. When the amount of the rubbery polymer exceeds about 80 weight %, mechanical physical properties and molding processability of the thermoplastic composition can be deteriorated.

In some embodiments, the second rubber-modified aromatic vinyl copolymer (B-2) may include about 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 weight % of the rubbery polymer based on about 100 weight % of the second rubber-modified aromatic vinyl copolymer (B-2). Further, according to some embodiments of the present invention, the amount of rubbery polymer can be in a range from about any of the foregoing amounts to about any other of the foregoing amounts.

Further, the second rubber-modified aromatic vinyl copolymer (B-2) may be used as a combination of two or more types having the different average particle sizes and amounts of the rubbery polymer.

(C) Metal Particles

The metal particles used in the present disclosure may be used singly or in combination of two or more types. The material for the metal particles may be any kinds of metals and/or alloys, for example aluminum. In addition, the surface of the metal particles may be coated and/or surface-treated.

The metal particles (C) may be included in an amount of about 0.1 to about 5 parts by weight, for example about 0.1 to about 2 parts by weight, based on about 100 parts by weight of the polycarbonate resin (A) and the rubber-modified aromatic vinyl copolymer (B), or about 100 parts by weight of the polycarbonate resin (A), the rubber-modified aromatic vinyl copolymer (B), and the aromatic vinyl copolymer (D).

When the amount of the metal particles is less than about 0.1 part by weight, it can be difficult to realize a metallic appearance of the thermoplastic composition. When the amount of the metal particles exceeds about 5 parts by weight, mechanical physical properties and/or molding processability of the thermoplastic composition can be significantly deteriorated.

The average particle size of the metal particles may be about 5 to about 100 µm, for example about 10 to about 60 µm. In some embodiments, the average particle size of the metal particles may be about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 µm.

When the average particle size of the metal particles is less than about 5 µm or exceeds about 100 µm, it can be difficult to realize a metallic appearance of the thermoplastic composition, and realization of excellent appearance properties can be limited because the orientation and/or non-uniformity of the metal particles can be significant.

Further, the metal particles (C) may be used as a combination of two or more types having the different average particle sizes. The type of metal particles may be changed according to the desired metallic appearance.

(D) Aromatic Vinyl Copolymer

The aromatic vinyl copolymer (D) used in the present disclosure is an unmodified aromatic vinyl copolymer. The aromatic vinyl copolymer (D) is prepared by copolymerizing an aromatic vinyl compound and a vinyl compound that may be copolymerized with an aromatic vinyl compound.

Examples of the aromatic vinyl compound may include without limitation styrene, α-methylstyrene, β-methylstyrene, p-methylstyrene, p-t-butylstyrene, ethylstyrene, vinylxylene, monochlorostyrene, dichlorostyrene, dibromostyrene, vinylnaphthalene, and the like, and mixtures thereof.

Examples of the vinyl compound that may be copolymerized with the aromatic vinyl compound may include without limitation acrylonitrile, methacrylonitrile, fumaronitrile, methacrylic acid alkyl esters, acrylic acid alkyl esters, maleic anhydride, alkyl and/or phenyl nucleus-substituted maleimide, and the like, and mixtures thereof. Herein, the term alkyl means $C_1$ to $C_8$ alkyl.

The aromatic vinyl copolymer (D) may be copolymerized from a mixture including about 60 to about 80 weight % of the aromatic vinyl compound and about 20 to about 40 weight % of the vinyl compound that may be copolymerized with the aromatic vinyl compound. In exemplary embodiments, the aromatic vinyl copolymer (D) may be copolymerized from a mixture including about 70 to about 80 weight % of the aromatic vinyl compound and about 20 to about 30 weight % of the vinyl compound that may be copolymerized with the aromatic vinyl compound. For example, the aromatic vinyl copolymer (D) may be copolymerized from a mixture including about 72 to about 80 weight % of the aromatic vinyl compound and about 20 to about 27 weight % of the vinyl compound that may be copolymerized with the aromatic vinyl compound.

In some embodiments, the mixture for preparing the aromatic vinyl copolymer (D) may include about 60, 61, 62, 63, 64, 65, 66, 67, 68, 69, 70, 71, 72, 73, 74, 75, 76, 77, 78, 79, or 80 weight % of the aromatic vinyl compound. Further, according to some embodiments of the present invention, the amount of aromatic vinyl compound can be in a range from about any of the foregoing amounts to about any other of the foregoing amounts.

In some embodiments, the mixture for preparing the aromatic vinyl copolymer (D) may include about 20, 21, 22, 23, 24, 25, 26, 27, 28, 29, 30, 31, 32, 33, 34, 35, 36, 37, 38, 39, or 40 weight % of the vinyl compound that may be copolymerized with the aromatic vinyl compound. Further, according to some embodiments of the present invention, the amount of vinyl compound can be in a range from about any of the foregoing amounts to about any other of the foregoing amounts.

The aromatic vinyl copolymer (D) may have a weight average molecular weight measured by Gel Permeation Chromatography (GPC) using polystyrene as a standard sample of about 50,000 to about 400,000 g/mol, for example about 50,000 to about 200,000 g/mol.

The aromatic vinyl copolymer (D) may include styrene-acrylonitrile copolymer (SAN).

The styrene-acrylonitrile copolymer (SAN) may be prepared by copolymerizing about 60 to about 85 weight % of styrene and about 15 to about 40 weight % of acrylonitrile, for example may be prepared by copolymerizing about 65 to about 80 weight % of styrene and about 20 to about 35 weight % of acrylonitrile.

The aromatic vinyl copolymer (D) may be included in the amount of about 1 to about 50 weight %, based on about 100 weight % of the polycarbonate resin (A), the rubber-modified aromatic vinyl copolymer (B), and the aromatic vinyl copolymer (D).

In some embodiments, the aromatic vinyl copolymer (D) may be included in the amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 weight %, based on about 100 weight % of the polycarbonate resin (A), the rubber-modified aromatic vinyl copolymer (B), and the aromatic vinyl copolymer (D). Further, according to some embodiments of the present invention, the amount of aromatic vinyl copolymer (D) can be in a range from about any of the foregoing amounts to about any other of the foregoing amounts.

When the amount of the aromatic vinyl copolymer (D) is within the above range, it can be effective to secure a balance of physical properties such as flowability, impact resistance and the like.

(E) Additives

Besides the aforementioned, the thermoplastic resin composition of the present disclosure may optionally include one or more additives (E) depending on the application thereof. Examples of the additives (E) may include, but not limited to, flame retardant, lubricant, plasticizer, heat stabilizer, antioxidant, light stabilizer, UV absorbent, releasing agent, colorant, and the like, and combinations thereof.

A flame retardant is a material that reduces combustibility. Examples of the flame retardant may include without limitation phosphate compounds, phosphite compounds, phosphonate compounds, polysiloxanes, phosphazene compounds, phosphinate compounds, melamine compounds, and the like, and combinations thereof.

A lubricant is a material for lubricating the interface of the thermoplastic resin composition between a metal surface that contacts the resin composition during processing, molding, and extruding, thereby helping the flow or movement of the resin composition. Herein, a generally used lubricant may be used.

A plasticizer is a material for improving the flexibility, processibility, and expansibility of the thermoplastic resin composition. Herein, a generally used plasticizer may be used.

A heat stabilizer is a material for minimizing or preventing thermal decomposition of the thermoplastic resin composition when being mixed and molded at high temperatures. A generally used material may be used as heat stabilizer.

An antioxidant is a material for minimizing or preventing chemical reaction of the thermoplastic resin composition with oxygen, thus preventing the resin composition from being decomposed and losing its intrinsic properties. Examples of the antioxidant may include without limitation phenolic type antioxidants, phosphate type antioxidants, thioether type antioxidants, amine type antioxidant, and the like, and combinations thereof.

A light stabilizer is a material for minimizing or preventing the thermoplastic resin composition from being color-changed or losing its mechanical properties due to decomposition by ultraviolet rays. Examples of the light stabilizer may include without limitation benzophenone type light stabilizer, benzothiazole type light stabilizer, amine type light stabilizer, and the like, and combinations thereof.

Examples of the UV absorbent may include without limitation titanium dioxide, carbon black, and the like, and combinations thereof.

Examples of the releasing agent may include without limitation fluorine-containing polymers, silicone oils, metal salts of stearic acid, metal salts of montanic acid, montanic ester waxes, polyethylene waxes, and the like, and combinations thereof.

Examples of the colorant may include without limitation pigments, dyes, and combinations thereof.

The thermoplastic resin composition may include one or more additives in an amount of about 0.1 to about 15 parts by weight, based on about 100 parts by weight of the polycarbonate resin (A) and the rubber-modified aromatic vinyl copolymer (B), or about 100 parts by weight of the polycarbonate resin (A), the rubber-modified aromatic vinyl copolymer (B) and the aromatic vinyl copolymer (D). For example, the additives may be included in an amount of about 0.1 to about 8 parts by weight. When the amount of the additives (E) is within the above range, the functions of the additives can be realized with minimal or no deterioration of appearance properties, physical properties and the like of the thermoplastic composition.

In some embodiments, the thermoplastic composition of the present disclosure may include about 0.1, 0.2, 0.3, 0.4, 0.5, 0.6, 0.7, 0.8, 0.9, 1, 2, 3, 4, 5, 6, 7, 8, 9, 10, 11, 12, 13, 14 or 15 parts by weight of the additives (E) based on about 100 parts by weight of the polycarbonate resin (A), the rubber-modified aromatic vinyl copolymer (B) and/or the aromatic vinyl copolymer (D). Further, according to some embodiments of the present invention, the amount of additives can be in a range from about any of the foregoing amounts to about any other of the foregoing amounts.

Exemplary embodiments also provide a molded article including the thermoplastic resin composition that can have excellent appearance properties. In some embodiments, the thermoplastic resin composition of the present disclosure may be used, without limitation, for various industrial fields, such as various electric electronic products, automobile components, miscellaneous goods, and the like. For example, the thermoplastic resin composition of the present disclosure may be used to prepare a molded article for automobile interior materials such as center fascia, control panel, console box, and the like.

The gloss of the molded article measured at an angle of 60° according to ASTM D523 may be about 20 to about 80 GU, for example about 30 to about 80 GU, and as another example about 40 to about 80 GU.

The molded article may have a ΔE value of about 3.0 or less, for example about 2.0 to about 2.8, and as another example about 2.3 to about 2.7, after exposure to 2,400 kJ/m$^2$ measured by the evaluation method according to FLTM BO 116-01.

Furthermore, the molded article may have a ΔE value of about 3.0 or less, for example about 2.0 to about 2.8, and as another example about 2.3 to about 2.7, after exposure to 1,050 kJ/m$^2$ measured by the evaluation method according to SAE J 1885.

It was confirmed through numerous tests that the thermoplastic resin composition of the present disclosure belonging to the relevant range can realize excellent physical properties as well as excellent appearance properties.

EXAMPLES

Herein below are examples that include test results to prove the excellent effects of the thermoplastic resin composition of the present disclosure.

The specifications of the polycarbonate resin (A), rubber-modified aromatic vinyl copolymer (B), metal particles (C), and aromatic vinyl copolymer (D) used in Examples and Comparative Examples of the present disclosure are as follows.

(A) Polycarbonate Resin

In the Examples and Comparative Examples of the present disclosure, a bisphenol-A type linear polycarbonate resin with the weight-average molecular weight of 25,000 g/mol is used.

(B) Rubber-Modified Aromatic Vinyl Copolymer

The rubber-modified aromatic vinyl copolymers (B) used in the Examples and Comparative Examples of the present disclosure are the following first rubber-modified aromatic vinyl copolymer (B-1-1), the following first rubber-modified aromatic vinyl copolymer (B-1-2), and the following second rubber-modified aromatic vinyl copolymer (B-2).

(B-1-1) First Rubber-Modified Aromatic Vinyl Copolymer

As the first rubber-modified aromatic vinyl copolymer (B-1-1), a copolymer including a rubber polymer having an average particle size of about 7.5 μm and a particle size distribution of about 5 to about 10 μm, which is prepared by a general mass polymerization process after mixing about 65 weight % of styrene and about 20 weight % of acrylonitrile with about 15 weight % of a polybutadiene rubbery polymer, is used.

(B-1-2) First Rubber-Modified Aromatic Vinyl Copolymer

As the first rubber-modified aromatic vinyl copolymer (B-1-2), a copolymer including a rubber polymer having an average particle size of about 1.0 μm and a particle size distribution of about 0.5 to about 1.5 μm, which is prepared by a general mass polymerization process after mixing about 65 weight % of styrene and about 20 weight % of acrylonitrile with about 15 weight % of a polybutadiene rubbery polymer, is used.

(B-2) Second Rubber-Modified Aromatic Vinyl Copolymer

As the second rubber-modified aromatic vinyl copolymer (B-2), a grafted copolymer including a rubber polymer having an average particle size of 0.3 μm and a particle size distribution of about 0.2 to about 0.4 μm, which is prepared by graft-copolymerizing through an emulsion polymerization process after mixing about 32 weight % of styrene and about 10 weight % of acrylonitrile with about 58 weight % of a polybutadiene rubbery polymer, is used.

(C) Metal Particles

In the Examples and Comparative Examples of the present disclosure, aluminum metal particles having an average particle size of about 30 μm and a particle size distribution of about 15 to about 60 μm, available from Yamoto Metal Company, are used.

(D) Aromatic Vinyl Copolymer

As the aromatic vinyl copolymer used in the Examples and Comparative Examples of the present disclosure, a styrene-acrylonitrile copolymer having a weight average molecular weight of about 100,000 g/mol prepared by a general suspension polymerization method using a monomer mixture including about 76 weight % of styrene and about 24 weight % of acrylonitrile is used.

Each of components according to the amount ratios shown in the following Table 1 and each of additives such as antioxidant, light stabilizer and the like in the same amount are added and melt-processed to produce a thermoplastic resin composition in the type of pellets. The extrusion is performed using a twin screw extruder with L/D=29 and diameter of about 45 mm, and the barrel temperature is set to be about 250° C. The prepared pellets are dried at 80° C. for 2 hours. Then, using a 60 oz injection molder, the cylinder temperature and the molding temperature are set to be about 250° C. and about 60° C., respectively, and then, specimens for evaluating physical properties, such as the specimens for evaluating the degree of gloss and appearance, having a size of 90 mm×50 mm×2.0 mm are manufactured.

TABLE 1

|  | Examples | | | | | | | | Comparative Examples | | | | | |
| --- | --- | --- | --- | --- | --- | --- | --- | --- | --- | --- | --- | --- | --- | --- |
|  | 1 | 2 | 3 | 4 | 5 | 6 | 7 | 8 | 1 | 2 | 3 | 4 | 5 | 6 |
| Polycarbonate resin (A) (wt %) | 65 | 65 | 65 | 65 | 65 | 65 | 75 | 75 | 65 | 65 | 65 | 65 | 75 | 90 |

TABLE 1-continued

| | | Examples | | | | | | | | Comparative Examples | | | | | |
|---|---|---|---|---|---|---|---|---|---|---|---|---|---|---|---|
| | | 1 | 2 | 3 | 4 | 5 | 6 | 7 | 8 | 1 | 2 | 3 | 4 | 5 | 6 |
| Vinyl-modified graft copolymer (B) (wt %) | (B-1-1) | 35 | — | 30 | 25 | — | 20 | 25 | 20 | — | — | 5 | — | — | — |
| | (B-1-2) | — | 35 | — | — | 25 | — | — | — | — | — | — | 5 | — | — |
| | (B-2) | — | — | 5 | — | — | 5 | — | 5 | 10 | 20 | 15 | 15 | 10 | 10 |
| Metal particles (C) (parts by weight) | | 1 | 1 | 1 | 1 | 1 | 1 | 1 | 1 | 1 | 1 | 1 | 1 | 1 | 1 |
| Aromatic vinyl copolymer (D) (wt %) | | — | — | — | 10 | 10 | 10 | — | — | 25 | 15 | 15 | 15 | 15 | — |

The specimens obtained by the compositions of the aforementioned Table 1 are evaluated for the degree of gloss, impact resistance, flowability, weather resistance, and appearance as follows, and the results thereof are listed in the following Table 2.

Physical Property Evaluation Method (1) Degree of gloss (Gloss, GU): The degree of gloss is measured at an angle of 60° by an evaluation method according to ASTM D523 using a BYK-Gardner Gloss Meter produced by BYK.

(2) Impact resistance (kgf·cm/cm): For a specimen having a thickness of ⅛ for measurement of Izod impact strength, the notched Izod impact strength is measured by an evaluation method according to ASTM D256.

(3) Flowability (g/10 min): For resin composition pellets, the melt-flow index is measured under the conditions of 250° C. and 10 kg by an evaluation method according to ASTM D1238.

(4) Light stability: The color difference change (ΔE) value is measured after exposure of 2,400 kJ/m² by an evaluation method according to FLTM B0116-01 by Ford.

(5) Appearance: For the specimen for evaluating appearance, the degree of flow-mark and the non-uniformity and orientation of the metal particles are evaluated with a naked eye, and then the values are classified into 1 to 5 points (1: bad to 5: good).

TABLE 2

| Physical properties | Examples | | | | | | | | Comparative Examples | | | | | |
|---|---|---|---|---|---|---|---|---|---|---|---|---|---|---|
| | 1 | 2 | 3 | 4 | 5 | 6 | 7 | 8 | 1 | 2 | 3 | 4 | 5 | 6 |
| Degree of gloss | 59 | 74 | 62 | 67 | 78 | 72 | 65 | 71 | 90 | 89 | 86 | 90 | 92 | 92 |
| Izod impact strength | 39 | 49 | 51 | 37 | 44 | 45 | 45 | 50 | 42 | 62 | 55 | 57 | 58 | 60 |
| Melt index | 37 | 45 | 35 | 44 | 49 | 41 | 31 | 29 | 51 | 37 | 45 | 47 | 22 | 15 |
| Color difference change | 1.4 | 1.5 | 1.9 | 1.1 | 1.3 | 1.5 | 1.0 | 1.4 | 3.7 | 4.9 | 4.3 | 4.4 | 3.5 | 3.1 |
| Appearance | 5 | 4 | 5 | 5 | 3 | 4 | 5 | 4 | 1 | 1 | 2 | 1 | 1 | 1 |

The aforementioned tests prove that the aforementioned combination of components and amount ratios of the components according to the present disclosure can provide a composition with excellent mechanical properties such as impact resistance and the like, light stability and appearance characteristics.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims. Therefore, the aforementioned embodiments should be understood to be exemplary but not limiting the present invention in any way.

What is claimed is:

1. A thermoplastic resin composition comprising:
(A) about 30 to about 90 weight % of a polycarbonate resin and (B) about 10 to about 70 weight % of a rubber-modified aromatic vinyl copolymer, each based on about 100 weight % of the polycarbonate resin (A) and the rubber-modified aromatic vinyl copolymer (B); and
(C) about 0.1 to about 5 parts by weight of metal particles based on about 100 parts by weight of the polycarbonate resin (A) and the rubber-modified aromatic vinyl copolymer (B),
wherein the rubber-modified aromatic vinyl copolymer (B) comprises about 30 to less than about 100 weight % of a first rubber-modified aromatic vinyl copolymer (B-1) comprising a rubbery polymer having an average particle size of about 0.5 to about 20 μm and greater than 0 to about 70 weight % of a second rubber-modified aromatic vinyl copolymer (B-2) comprising a rubbery polymer having an average particle size of about 0.1 to less than about 0.5 μm,
wherein a molded article produced from the thermoplastic resin composition prepared under injection molding at a cylinder temperature set to about 250° C. and a molding temperature set to about 60° C. has a degree of gloss of 59 to about 80 GU measured at an angle of 60° by an evaluation method according to ASTM D523.

2. The thermoplastic resin composition according to claim 1, wherein the first rubber-modified aromatic vinyl copolymer (B-1) comprises about 5 to about 30 weight % of the rubbery polymer having an average particle size of about 0.5 to about 20 μm based on about 100 weight % of the first rubber-modified aromatic vinyl copolymer (B-1).

3. The thermoplastic resin composition according to claim 1, wherein the second rubber-modified aromatic vinyl copolymer (B-2) comprises about 30 to about 80 weight % of the rubbery polymer having an average particle size of about 0.1 to less than about 0.5 μm based on about 100 weight % of the second rubber-modified aromatic vinyl copolymer (B-2).

4. The thermoplastic resin composition according to claim 1, wherein an average particle size of the metal particles (C) is about 5 to about 100 μm.

5. The thermoplastic resin composition according to claim 1, wherein the composition further comprises an aromatic vinyl copolymer (D).

6. The thermoplastic resin composition according to claim 5, comprising about 30 to about 80 weight % of the polycarbonate resin (A), about 10 to about 60 weight % of the rubber-modified aromatic vinyl copolymer (B), and about 1 to about 50 weight % of the aromatic vinyl copolymer (D), each based on about 100 weight % of the polycarbonate resin (A), the rubber-modified aromatic vinyl copolymer (B) and the aromatic vinyl copolymer (D), and about 0.1 to about 5 parts by weight of the metal particles (C) based on about 100 parts by weight of the polycarbonate resin (A), the rubber-modified aromatic vinyl copolymer (B) and the aromatic vinyl copolymer (D).

7. The thermoplastic resin composition according to claim 1, further comprising an additive (E) including a flame retardant, lubricant, plasticizer, heat stabilizer, antioxidant, light stabilizer, UV absorbent, releasing agent, colorant, or a combination thereof.

8. The thermoplastic resin composition according to claim 1, wherein a molded article produced from the thermoplastic resin composition has a ΔE value of about 3.0 or less after exposure to 2,400 kJ/m$^2$ as measured by an evaluation method according to FLTM BO 116-01.

9. The thermoplastic resin composition according to claim 1, wherein the rubber-modified aromatic vinyl copolymer (B) comprises: about 70 to about 95 weight % of the first rubber-modified aromatic vinyl copolymer (B-1) comprising the rubbery polymer having an average particle size of about 0.5 to about 20 μm; and about 5 to about 30 weight % of the second rubber-modified aromatic vinyl copolymer (B-2) comprising the rubbery polymer having an average particle size of about 0.1 to less than about 0.5 μm.

10. The thermoplastic resin composition according to claim 1, wherein a molded article produced from the thermoplastic resin composition prepared under injection molding at a cylinder temperature set to about 250° C. and a molding temperature set to about 60° C. has a degree of gloss of 62 to about 80 GU measured at an angle of 60° by an evaluation method according to ASTM D523.

11. A molded article produced from the thermoplastic resin composition according to claim 1.

12. The molded article according to claim 11, having a ΔE value of about 3.0 or less after exposure to 2,400 kJ/m$^2$ as measured by an evaluation method according to FLTM BO 116-01.

13. The molded article according to claim 11, having a ΔE value of about 3.0 or less after exposure to 1,050 kJ/m$^2$ as measured by an evaluation method according to SAE J 1885.

14. A molded article produced from the thermoplastic resin composition according to claim 5.

15. The molded article according to claim 14, having a ΔE value of about 3.0 or less after exposure to 2,400 kJ/m$^2$ as measured by an evaluation method according to FLTM BO 116-01.

16. The molded article according to claim 14, having a ΔE value of about 3.0 or less after exposure to 1,050 kJ/m$^2$ as measured by an evaluation method according to SAE J 1885.

* * * * *

UNITED STATES PATENT AND TRADEMARK OFFICE
CERTIFICATE OF CORRECTION

PATENT NO. : 9,862,822 B2
APPLICATION NO. : 14/930954
DATED : January 9, 2018
INVENTOR(S) : Keehae Kwon et al.

It is certified that error appears in the above-identified patent and that said Letters Patent is hereby corrected as shown below:

In the Specification

Column 14, delete Line 48 and insert:
--is performed using a twin screw extruder with L/D = 29 and--

Signed and Sealed this
Eleventh Day of September, 2018

Andrei Iancu
*Director of the United States Patent and Trademark Office*